(12) United States Patent
Jacquot

(10) Patent No.: US 7,882,430 B2
(45) Date of Patent: Feb. 1, 2011

(54) UTILITY, METHOD AND DEVICE PROVIDING VECTOR IMAGES THAT MAY BE FORMATTED FOR DISPLAY IN DIFFERENT LOCALES

(75) Inventor: Bryan J. Jacquot, Windsor, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1497 days.

(21) Appl. No.: 11/260,918

(22) Filed: Oct. 27, 2005

(65) Prior Publication Data

US 2007/0100597 A1    May 3, 2007

(51) Int. Cl.
G06F 17/00 (2006.01)
G06F 3/048 (2006.01)
(52) U.S. Cl. ...................... 715/241; 715/765
(58) Field of Classification Search ................. 345/781, 345/772, 650; 382/162, 115; 701/208; 703/20; 705/14, 26, 27; 707/5, 10, 517, 523; 715/513, 715/745, 760, 765, 800, 241
See application file for complete search history.

(56) References Cited

U.S. PATENT DOCUMENTS

| | | | |
|---|---|---|---|
| 5,727,135 A | 3/1998 | Webb et al. | |
| 7,082,436 B1* | 7/2006 | Bayiates | 707/770 |
| 7,545,992 B2* | 6/2009 | Kato et al. | 382/239 |
| 7,716,568 B2* | 5/2010 | Ido et al. | 715/204 |
| 7,737,993 B2* | 6/2010 | Kaasila et al. | 345/613 |
| 2002/0091738 A1* | 7/2002 | Rohrabaugh et al. | 707/517 |
| 2003/0020726 A1 | 1/2003 | Charpentier | |
| 2003/0071847 A1* | 4/2003 | Vacquie | 345/772 |
| 2003/0090459 A1 | 5/2003 | Lapstun et al. | |
| 2003/0115552 A1* | 6/2003 | Jahnke et al. | 715/536 |
| 2003/0154266 A1 | 8/2003 | Bobick et al. | |
| 2003/0164822 A1* | 9/2003 | Okada | 345/204 |
| 2004/0030778 A1 | 2/2004 | Kronenberg et al. | |
| 2004/0083138 A1 | 4/2004 | Silverbrook et al. | |
| 2004/0093559 A1 | 5/2004 | Amaru et al. | |
| 2004/0104928 A1* | 6/2004 | Morioka | 345/736 |
| 2004/0117056 A1* | 6/2004 | Abuku | 700/121 |

(Continued)

FOREIGN PATENT DOCUMENTS

EP    1209558 A2    5/1996

(Continued)

OTHER PUBLICATIONS

Bruhn, Russel, et al, "Displaying Mathematics in a Web Browser Using MathML and SVG", MSCCC '04: Proceedings of the 2nd Annual Conference on Mid-South College Computing, Apr. 2004, pp. 97-106.*

(Continued)

Primary Examiner—Laurie Ries

(57) ABSTRACT

In one embodiment, in response to receiving an image request, a computer-implemented method: 1) retrieves a vector image from a device that is a target of the image request, the vector image illustrating at least a portion of the device; 2) determines a locale for display of the vector image; 3) selects a locale tag from among a number of locale tags stored within the vector image, in accord with the determined locale; and 4) formats the vector image in accord with display data associated with the selected locale tag. Other embodiments are also disclosed.

25 Claims, 5 Drawing Sheets

U.S. PATENT DOCUMENTS

2005/0132286 A1* 6/2005 Rohrabaugh et al. ........ 715/523
2005/0225789 A1* 10/2005 Ferlitsch .................... 358/1.13
2006/0010115 A1 1/2006 Yoshida et al.

FOREIGN PATENT DOCUMENTS

| JP | 2002251279 A | 9/2002 |
|---|---|---|
| JP | 2004-310154 A | 11/2004 |
| WO | 94/11804 A1 | 5/1994 |

OTHER PUBLICATIONS

Web Internationalization—Standards and Practices, 26th Internationalization and Unicode Conference, Sep. 2004, 24 pages.

* cited by examiner

UTILITY, METHOD AND DEVICE PROVIDING VECTOR IMAGES THAT MAY BE FORMATTED FOR DISPLAY IN DIFFERENT LOCALES

BACKGROUND

The management of a device is typically aided by providing its user with a means to graphically visualize the device. In some cases, one or more images of a device and its components may be included within paper or electronic documentation (e.g., a user manual). In other cases, a device may be provided with stickers showing one or more views of the device's interior components.

In still other cases, images of a device may be incorporated into a management tool for the device. For example, a print driver may display an image of the printer to which it corresponds, or a server management tool may display various images associated with the server components of which the management tool is aware or can manage (e.g., the server's memory modules, interfaces, or storage disks).

Many devices for which graphical images are needed are subject to change. That is, the devices may be upgradeable such that additional components (e.g., memory modules, interfaces, or storage disks) may be inserted into or attached to the device. Thus, an issue facing the image creator is whether to draw an image of each configuration of the device or draw a single "exemplary" image in which the device is depicted in one particular "default" configuration.

A device may also be subject to change over its lifecycle. That is, the styling of the device's exterior, the suppliers of its internal components, its "default" configuration, and even its available features can change over its lifecycle. Thus, any images pertaining to the first generation of the device may not accurately depict later generations of the device.

As one can appreciate, the creation and maintenance of graphical images for a device can present a significant burden for both device manufacturers and third-party device supporters (e.g., management tool developers).

SUMMARY OF THE INVENTION

In one embodiment, an image formatting utility comprises code to, in response to receiving an image request, 1) retrieve a vector image from a device that is a target of the image request, the vector image illustrating at least a portion of the device; 2) determine a locale for display of the vector image; 3) select a locale tag from among a number of locale tags within the vector image, in accord with the determined locale; and 4) format the vector image in accord with display data associated with the selected locale tag.

In another embodiment, a computer-implemented method for formatting images of a device comprises, in response to receiving an image request, 1) retrieving a vector image from a device that is a target of the image request, the vector image illustrating at least a portion of the device; 2) determining a locale for display of the vector image; 3) selecting a locale tag from among a number of locale tags stored within the vector image, in accord with the determined locale; and 4) formatting the vector image in accord with display data associated with the selected locale tag.

In yet another embodiment, a device comprises a non-volatile memory in which a vector image illustrating at least a portion of the device is stored. The vector image comprises a plurality of vectors and a plurality of locale tags. The locale tags are associated with display data that is customized for two or more different locales. The device also comprises an interface to, upon receiving a request for the vector image, return the vector image.

In another embodiment, an image formatting utility comprises code to, in response to receiving an image request, 1) retrieve a vector image from a device that is a target of the image request, the vector image illustrating at least a portion of the device; 2) determine a locale for display of the vector image; 3) select a message ID from among a number of message IDs within the vector image; 4) in accord with the determined locale, retrieve a message corresponding to both the message ID and the determined locale; and 5) format the vector image in accord with the retrieved message.

Other embodiments are also disclosed.

BRIEF DESCRIPTION OF THE DRAWINGS

Illustrative embodiments of the invention are illustrated in the drawings, in which.

DETAILED DESCRIPTION

One development that has eased the burden of creating and maintaining graphical images for a device is the electronic storage of a device's images within the device itself. For example, different images pertaining to different views and/or components of a device may be saved as Scalable Vector Graphics (SVG) images, or other easy-to-manipulate image types, and stored within a non-volatile memory of the device (preferably, but not always, in the device's firmware). Thus, a management tool for the device no longer needs to provide its own set of images for the device. Rather, the management tool need only be provided with abilities to 1) query the device to retrieve an image of the device, and 2) format the image to reflect the current state of the device. In this manner, the developer of the management tool need not be concerned with how the device looks, and can instead focus on how the device functions and is managed.

Figure 1:
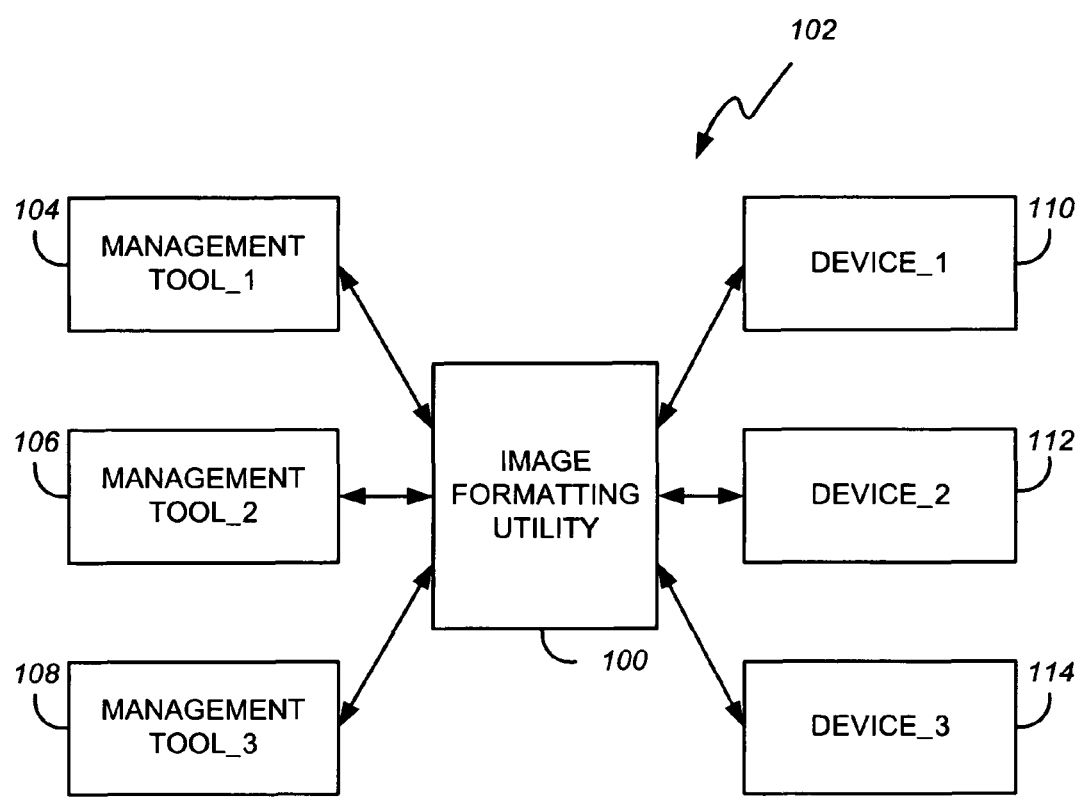
FIG. 1 illustrates an exemplary system in which an image formatting utility may be used.

To further ease a management tool developer's burden of having to work with device images, an image formatting utility 100 (FIGS. 1 & 2), and system incorporating same, are disclosed herein. By way of example, the "utility" 100 may take the form of an application or browser plug-in that is embodied in computer-readable code stored on one or more computer-readable media. The computer-readable media may include, for example, any number or mixture of fixed or configurable media (such as one or more fixed disks, random access memories (RAMs), read-only memories (ROMs), or compact discs), at either a single location or distributed over a network.

Before describing the image formatting utility 100 in detail, an exemplary system 102 (FIG. 1) in which the image formatting utility 100 may be used will be described.

The system 102 comprises one or more device management tools 104, 106, 108 for generating image requests, and one or more devices 110, 112, 114 that may be targets of the image requests. Each of the devices 110-114 is provided with a non-volatile memory in which one or more images (i.e., an image set) illustrating at least a portion of the device is stored. Assuming that the management tools 104-108 and devices 110-114 comprise interfaces that are compatible with those of the image formatting utility 100, the utility 100 may 1) receive plural image requests from any one or more of the management tools 104-108, and 2) in responding to the plural image requests, format images retrieved from a plurality of the devices 110-114 and return the formatted images to the requesting ones of the management tools 104-108. Of note, the management tools 104-108 and devices 110-114 of the system 102 have no direct link to, nor dependence on, each other. Thus, one or the other can easily be modified or appended to without affecting the other. Furthermore, the image(s) stored within the devices 110-114 can be updated without any need to worry about how the updated images will be drawn by the utility 100 or the management tools 104-108.

The management tools 104-108 of the system 102 may take various forms, including, for example, those of a: print driver, configuration manager, licensing manager, server manager, system manager, or network manager. In one embodiment of the system 102, one or more of the device management tools 104-108 may present a user interface (e.g., a graphical user interface (GUI)) through a web browser.

The devices 110-114 of the system 102 may also take various forms, including, for example, those of a: server, computer system, printer, or network. Further, the devices in which images are stored may be parts of other devices. For example, images may be stored in a memory of a computer motherboard, while additional images may be stored in a configurable video or networking card that has been inserted into a slot of the motherboard.

In one embodiment, the image or images (i.e., image set) stored within a device comprise SVG images. SVG is a language for describing two-dimensional graphics and graphical applications in eXtensible markup language (XML). SVG specifications are published by the World Wide Web Consortium (W3C®). SVG images are particularly suited to being stored in a device as a result of their small storage requirements, scalable size, and configurability. Alternately, a device's image set may comprise other types of easy-to-manipulate images, such as other vector-based images (e.g., postscript images).

Each device 110-114 may store its image set in a non-volatile memory. The images in each image set illustrate at least a portion of the device in which they are stored, and in some cases may illustrate different portions or views of the device. For purposes which will become clear later in this description, one or more of the stored images may comprise a plurality of embedded locale tags 202, 204, 206 (FIG. 2) and/or message identifiers 302 (IDs, FIG. 3), the purpose of which will be described later in this description.

In a simple embodiment, each of the devices 110-114 need only have an ability to fetch and return its stored image set (possibly only one image). However, in other embodiments, a device interface may have an ability to fetch a particular image (e.g., via address, number or type).

Although the exemplary system 102 illustrates the utility 100 being stored and executed apart from any management tools 104-108 or devices 110-114, the utility 100 could alternately be stored and executed locally to a particular management tool or device (e.g., within a device).

Figure 4:
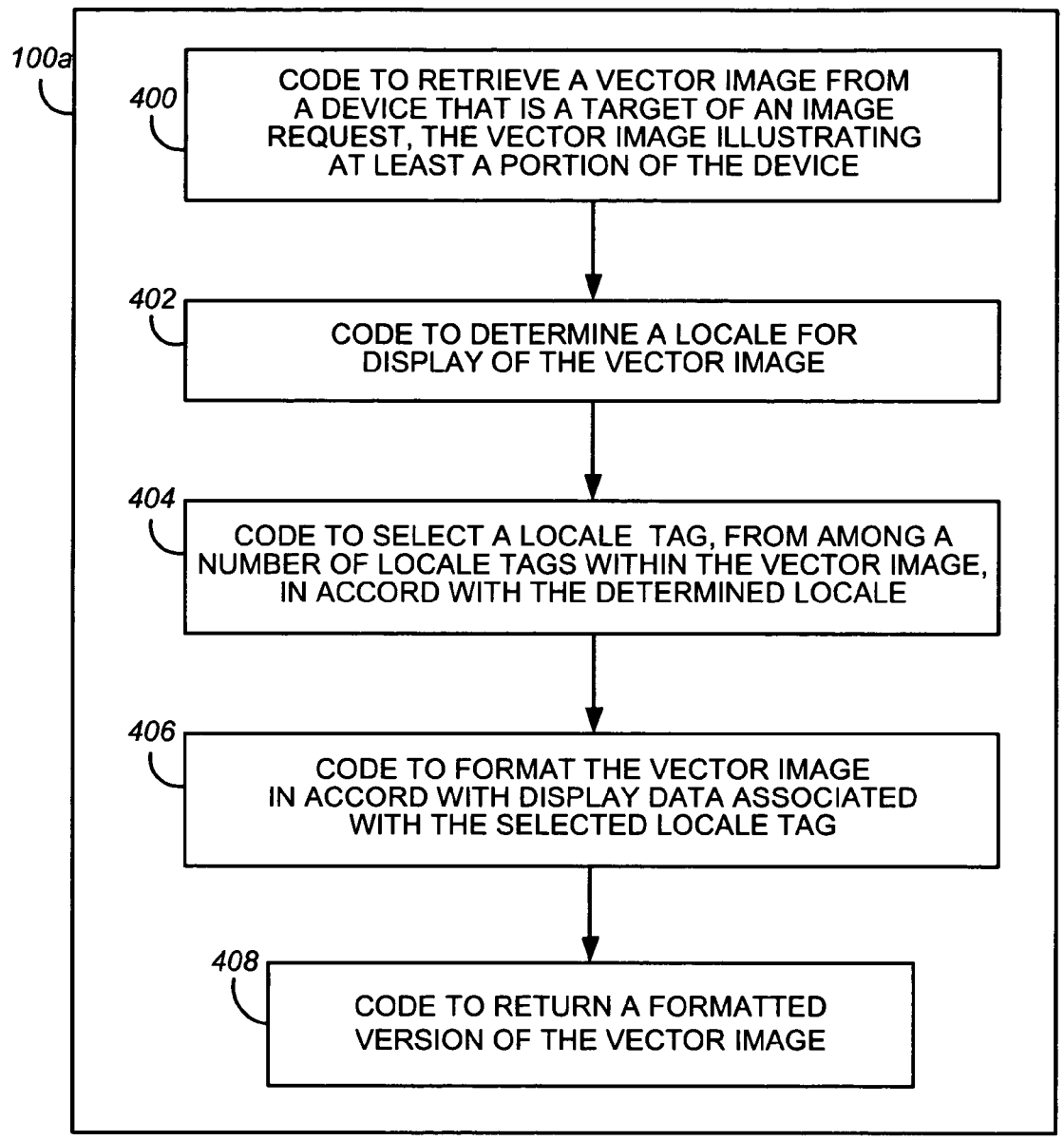
FIG. 4 illustrates a first exemplary embodiment of the image formatting utility shown in FIG. 1.

Having described exemplary contexts in which the utility 100 may be used, exemplary embodiments of the utility 100 will now be described in greater detail. As shown in FIG. 4, the utility 100a comprises code 400 to, in response to receiving an image request from a device management tool, retrieve a vector image from a device that is a target of the image request.

Before, during or after retrieval of the vector image, code 402 determines a locale for display of the vector image. Typically, a locale will dictate (or specify) a language preference, as well as date and monetary conventions, and other preferences or conventions for the display of alphanumeric (and sometimes graphic) data. In other cases, the code 402 may determine a locale by reading a locale system variable from, for example, a computer system from which an image request is received, a computer system on which the image formatting utility 100a is run (which computer systems may sometimes be the same computer system), or a memory shared by both the utility 100a and a management tool. Typically, one or more locale system variables will be maintained by the operating system (OS) of a computer system.

Figure 2:
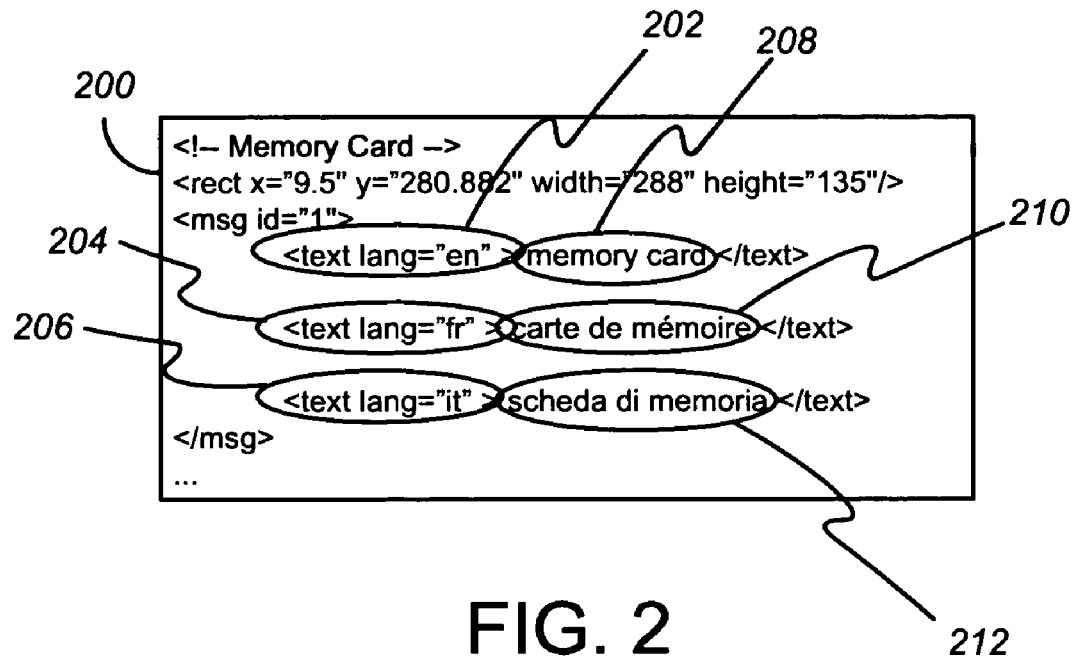
FIG. 2 illustrates an exemplary vector image comprising embedded locale tags.

After retrieving an image and determining a locale, code 404 selects a locale tag from among a number of locale tags within the image, in accord with the determined locale. For example, FIG. 2 illustrates part of a textual description of a vector image 200 comprising locale tags 202, 204, 206 labeled: text lang="en"; text lang="fr"; and text lang="it". If code 402 has determined that a locale is "English (US)", then code 404 may select the locale tag "text lang="en"". Code 406 then formats the image 200 in accord with "display data" that is associated with the selected locale tag. In FIG. 2, the display data comprises the language-specific text "memory card" 208. However, the display data 208, 210, 212 may alternately (or also) comprise, for example, any of a number of locale-dependent display items or image formatting instructions (e.g., a date, time, currency, or direction of text). In some cases, locale-dependent conventions or image formatting instructions may even comprise preferred font styles and/or image color schemes.

In one embodiment, the code 404 merely parses an image to identify one or more locale tags that exactly correspond to a particular locale. In other embodiments, the code 404 may, upon determining that no match exists between a particular locale and any of an image's locale tags, select one or more locale tags that are identified within the image as being default locale tags. For the code 404 to function in this manner, however, certain locale tags must be identified within an image as being "default" locale tags, or an image must include some indication of its "default" locale.

The code 404 may also operate by, upon determining that no match exists between a particular locale and any of an image's locale tags, accessing a set of locale substitution rules to determine a locale tag within the image that most closely corresponds to a particular locale. In one embodiment, the locale substitution rules which of a number of more common locales can be substituted for a number of less common locales (which locales might not be contemplated by a particular image). Preferably, the substitution rules are maintained by the utility 100a. Alternately, the substitution rules could be maintained, for example, by a management tool or a computer system's OS.

Upon formatting a vector image for a particular locale, code 408 (FIG. 4) may return a formatted version of the vector image to a device management tool that requested the image.

In some cases, the formatted image returned by the code 408 may comprise a formatted image that is in the native format of a retrieved vector image (e.g., an SVG format). In other cases, the formatting of a vector image may comprise rendering the image (i.e., converting the image to a raster-based format).

As previously indicated, the code 400-408 may be included within a utility 100a that stands apart from other management tools 104-108 and devices 110-114. Alternately, instances of the code 400-408 may be provided as part of the management tools 104-108, or may be stored and executed by the devices 110-114.

Figure 5:
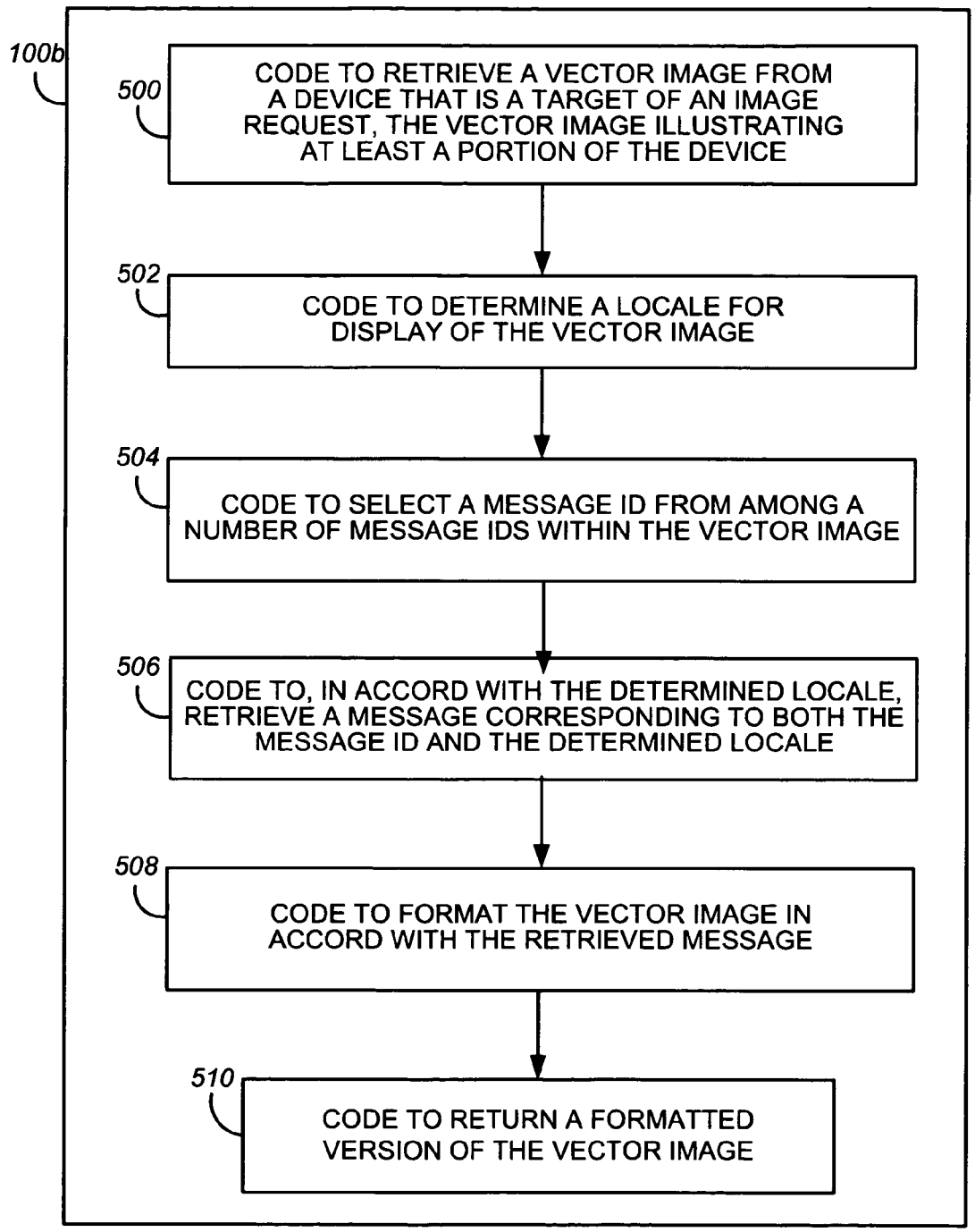
FIG. 5 illustrates a second exemplary embodiment of the image formatting utility shown in FIG. 1.

FIG. 5 illustrates an alternate embodiment 100b of utility 100. In the utility 100b, code 500 responds to receipt of an image request by retrieving a vector image from a device that is a target of the image request. Before, during or after retrieval of the vector image, code 502 determines a locale for display of the vector image. Code 504 then selects a message ID from among a number of message IDs within the vector image and, in accord with the determined locale, code 506 retrieves a message corresponding to both the message ID and the determined locale. Code 508 then formats the vector image in accord with the retrieved message. Code 510 may then return a formatted version of the vector image to a device management tool.

The message (or messages) retrieved by the utility 100b may be stored in one or more message catalogs, such as 1) a message catalog containing sets of messages corresponding to different locales, or 2) a plurality of message catalogs, each of which contains a set of messages corresponding to a different locale. In some cases, the one or more message catalogs may be stored within the device from which an image is retrieved. However, in other cases, the message catalog(s) may be stored by the utility 100b, or by a management tool.

The utility 100b can be advantageous over the utility 100a in that a vector image may be made "lighter" by removing localized display data from the image. However, the utility 100a can be advantageous in that there is no need to search for localized message text stored apart from its retrieved images (i.e., the localized message text for a particular image is contained within the image).

Although the above description has primarily focused on the formatting of an image in accord with the display data associated with only a single locale tag or message ID, it is envisioned that the code 400-408, 500-510 disclosed herein may be used to 1) select multiple locale tags or message IDs from within an image, and 2) format the image in accord with display data associated with each of the multiple locale tags or message IDs.

Figure 3:
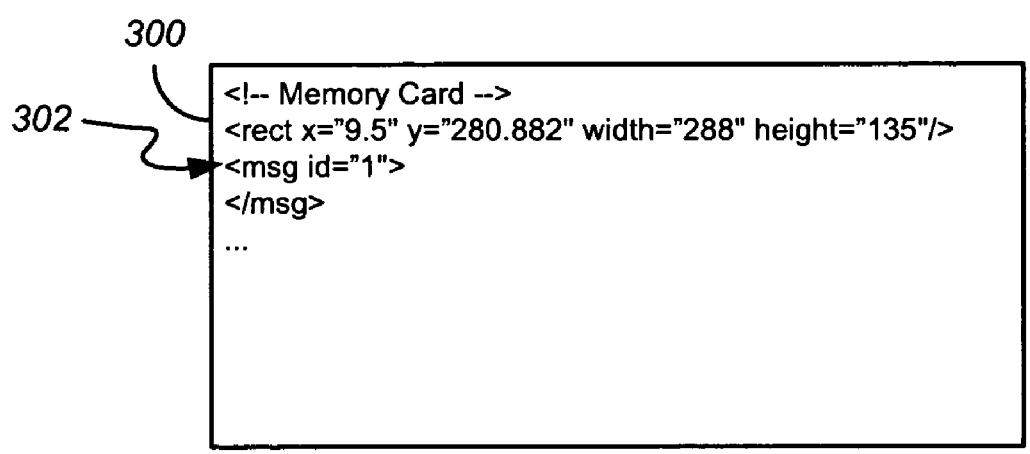
FIG. 3 illustrates an exemplary vector image comprising embedded message IDs.
Figure 6:
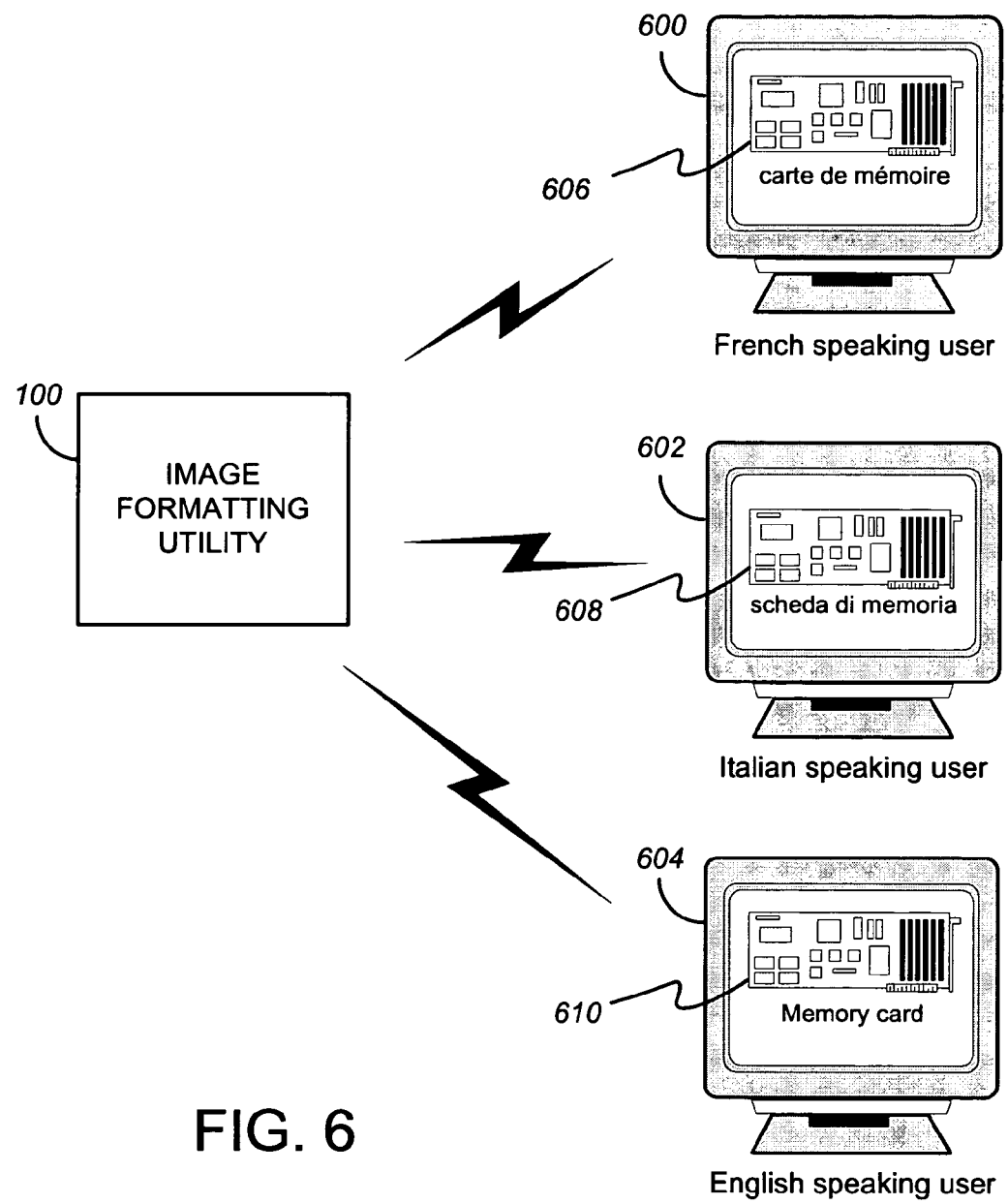
FIG. 6 illustrates an exemplary network of computer stations receiving images formatted by the image formatting utility of FIG. 1.

FIG. 6 illustrates a plurality of computer stations 600, 602, 604 on which the same or different management tools may be run. As noted in FIG. 6, station 600 is operated in a French locale, station 602 is operated in an Italian locale, and station 604 is operated in an English locale. By virtue of images of a device being stored in the device as shown in FIGS. 2 & 3, the same or different images 606, 608, 610 may be retrieved and formatted by the utility 100 so that each of the stations 600, 602, 604 is provided an image that is formatted for its particular locale.

Regardless of whether a vector image comprises embedded messaged IDs, locale tags or both, it is noted that the devices, methods and apparatus disclosed herein allow a device image to be updated for new locales without having to modify the device in which the image is stored, its interfaces, or any formatting utility or management tool that retrieves and processes the device's images. The devices, methods and apparatus disclosed herein also allow a device image to be localized without a need to duplicate large parts (or all) of the image, which previously had to be done when localizing a raster image of a device. Furthermore, in the case of a vector image having embedded locale tags associated with corresponding display data, a formatting utility or management tool which needs to process the image need be provided with very little code to localize the image.

What is claimed is:

1. A computer readable storage medium having computer readable instructions stored thereon which, when executed, cause a computer to perform a method of image formatting, said method comprising:

in response to receiving an image request,
retrieving a vector image from a device that is a target of the image request, the vector image illustrating at least a portion of the device;
determining a locale for display of the vector image;
selecting a locale tag from among a number of locale tags within the vector image, in accord with the determined locale; and
formatting the vector image in accord with display data associated with the selected locale tag.

2. The computer readable storage medium of claim 1, wherein said determining a locale for display of the vector image comprises:
determining the locale by reading a locale system variable.

3. The image formatting utility of claim 2, wherein said determining the locale by reading a locale system variable comprises:
reading the locale system variable from a computer system from which the image request is received.

4. The computer readable storage medium of claim 2, wherein said determining the locale by reading a locale system variable comprises:
reading the locale system variable from a computer system on which the image formatting utility is run.

5. The computer readable storage medium of claim 1, wherein said determining a locale for display of the vector image comprises:
determining the locale from information received with the image request.

6. The computer readable storage medium of claim 1, wherein said selecting a locale tag from among a number of locale tags within the vector image, in accord with the determined locale comprises:
upon determining that no match exists between the determined locale and any of the number of locale tags, selecting a locale tag that is identified within the vector image as being a default locale tag.

7. The computer readable storage medium of claim 1, further comprising:
employing a set of locale substitution rules; and
upon a determination during said selecting that no match exists between the determined locale and any of the number of locale tags, accessing the locale substitution rules to determine a locale tag that most closely corresponds to the determined locale.

8. The computer readable storage medium of claim 1, wherein the display data associated with the selected locale tag comprises language-specific text.

9. The computer readable storage medium of claim 1, wherein the display data comprises locale-dependent image formatting instructions.

10. The computer readable storage medium of claim 1, wherein said selecting a locale tag from among a number of locale tags within the vector image, in accord with the determined locale comprises selecting a plurality of locale tags in accord with the determined locale; and
wherein said formatting the vector image in accord with display data associated with the selected locale tag comprises formatting the vector image in accord with display data associated with each of the selected locale tags.

11. The computer readable storage medium of claim 1, wherein said formatting the vector image in accord with display data associated with the selected locale tag comprises rendering the vector image.

12. A computer-implemented method for formatting images of a device, comprising:
in response to receiving an image request,
retrieving a vector image from a device that is a target of the image request, the vector image illustrating at least a portion of the device;
determining a locale for display of the vector image;
selecting a locale tag from among a number of locale tags stored within the vector image, in accord with the determined locale; and
formatting the vector image in accord with display data associated with the selected locale tag.

13. The method of claim 12, wherein determining the locale comprises reading a locale system variable.

14. The method of claim 13, wherein reading the locale system variable comprises reading a locale system variable from a computer system from which the image request is received.

15. The method of claim 13, wherein reading the locale system variable comprises reading a locale system variable from a computer system on which the image formatting utility is run.

16. The method of claim 12, wherein determining the locale comprises determining the locale from information received with the image request.

17. The method of claim 12, wherein selecting the locale tag comprises, upon determining that no match exists between the determined locale and any of the number of locale tags, selecting a locale tag within the vector image that is identified as being a default locale tag.

18. The method of claim 12, wherein selecting the locale tag comprises, upon determining that no match exists between the determined locale and any of the number of locale tags, accessing a set of locale substitution rules to determine a locale tag that most closely corresponds to the determined locale.

19. The method of claim 12, further comprising:
selecting a plurality of locale tags in accord with the determined locale; and
formatting the vector image in accord with display data associated with each of the selected locale tags.

20. A device, comprising:
a non-volatile memory in which a vector image illustrating at least a portion of the device is stored, the vector image comprising a plurality of vectors and a plurality of locale tags, the locale tags being associated with display data that is customized for two or more different locales; and
an interface to, upon receiving a request for the vector image, return the vector image.

21. The device of claim 20, wherein the display data associated with at least some of the locale tags comprises language-specific text.

22. The device of claim 20, wherein the display data associated with at least some of the locale tags comprises locale-dependent image formatting instructions.

23. A computer readable storage medium having computer readable instructions stored thereon which, when executed, cause a computer to perform a method of image formatting, said method comprising:
in response to receiving an image request,
retrieving a vector image from a device that is a target of the image request, the vector image illustrating at least a portion of the device;
determining a locale for display of the vector image;
selecting a message ID from among a number of message IDs within the vector image;
in accord with the determined locale, retrieving a message corresponding to both the message ID and the determined locale; and
formatting the vector image in accord with the retrieved message.

24. The computer readable storage medium of claim 23, wherein said retrieving a message corresponding to both the message ID and the determined locale comprises retrieving the message from a message catalog stored within the device.

25. The computer readable storage medium of claim 23, wherein said retrieving a message corresponding to both the message ID and the determined locale comprises retrieving the message from a message catalog maintained by the management tool.

* * * * *